(12) United States Patent
Morehead

(10) Patent No.: US 10,719,668 B2
(45) Date of Patent: Jul. 21, 2020

(54) SYSTEM FOR MACHINE TRANSLATION

(71) Applicant: Graham Morehead, San Francisco, CA (US)

(72) Inventor: Graham Morehead, San Francisco, CA (US)

(*) Notice: Subject to any disclaimer, the term of this patent is extended or adjusted under 35 U.S.C. 154(b) by 50 days.

(21) Appl. No.: 15/911,432

(22) Filed: Mar. 5, 2018

(65) Prior Publication Data
US 2019/0228074 A1     Jul. 25, 2019

Related U.S. Application Data

(63) Continuation of application No. 15/069,541, filed on Mar. 14, 2016, now Pat. No. 9,940,321.

(51) Int. Cl.
| | |
|---|---|
| G06F 40/58 | (2020.01) |
| G06F 40/30 | (2020.01) |
| G06F 40/42 | (2020.01) |
| G06F 40/44 | (2020.01) |
| G06F 40/205 | (2020.01) |
| G06F 40/216 | (2020.01) |

(52) U.S. Cl.
CPC ............ G06F 40/58 (2020.01); G06F 40/205 (2020.01); G06F 40/216 (2020.01); G06F 40/30 (2020.01); G06F 40/42 (2020.01); G06F 40/44 (2020.01)

(58) Field of Classification Search
CPC ....................................................... G06F 17/28
See application file for complete search history.

(56) References Cited

U.S. PATENT DOCUMENTS

| | | | |
|---|---|---|---|
| 7,539,619 B1 * | 5/2009 | Seligman ............ | G06F 17/2755 704/2 |
| 8,515,733 B2 * | 8/2013 | Jansen ................. | G06F 17/271 704/1 |

(Continued)

OTHER PUBLICATIONS

Jain, Manoj, and Om P. Damani. "English to UNL (Interlingua) enconversion." Proc. Second Conference on Language and Technology,(CLT). 2009. (Year: 2009).*

(Continued)

*Primary Examiner* — Brian L Albertalli
(74) *Attorney, Agent, or Firm* — Law Office of Jerry Joseph, PLC; Jerry Joseph

(57) ABSTRACT

A system for translation from a first human language to a second language including one or more processors and one or more non-transitory memory units coupled to said one or more processors storing computer readable program instructions, wherein the computer readable program instructions configure the one or more processors to perform the steps of: receive an input representation of information in the first language, convert the input representation of information in the first language to one or more sets of one or more marked-lemma dependency trees (MDTs), convert said one or more sets of one or more marked-MDTs to a representation of information in said second language, and output said representation of information in said second language, wherein the MDTs are represented in a mathematically-equivalent or isomorphic memory structure using one of word embeddings, sense embeddings, tree kernels, capsules, pose vectors, embeddings, and vectorizations.

3 Claims, 7 Drawing Sheets

(56) References Cited

U.S. PATENT DOCUMENTS

2012/0259621 A1* 10/2012 Anisimovich ...... G06F 17/2755
                                                      704/9
2012/0271627 A1* 10/2012 Danielyan .......... G06F 17/2755
                                                      704/9

OTHER PUBLICATIONS

Lavoie, Benoit, et al. "A framework for MT and multilingual NLG systems based on uniform lexico-structural processing." Proceedings of the sixth conference on Applied natural language processing. Association for Computational Linguistics, 2000. (Year: 2000).*

AlAnsary, Sameh. "Interlingua-based Machine Translation Systems: UNL versus other interlinguas." 11th International Conference on Language Engineering, Ain Shams University, Cairo, Egypt. 2011. (Year: 2011).*

Kittredge, Richard, Lidija Iordanskaja, and Alain Polguère. "Multilingual text generation and the meaning-text theory." Proceedings of TMI-88, Pittsburgh, PA, Jun. 1988. (Year: 1988).*

Dinu, Georgiana, and Marco Baroni. "How to make words with vectors: Phrase generation in distributional semantics." Proceedings of the 52nd Annual Meeting of the Association for Computational Linguistics (vol. 1: Long Papers). vol. 1. 2014. (Year: 2014).*

Masterman, Margaret. "Semantic message detection for machine translation, using an interlingua." Proc. 1961 International Conf. on Machine Translation. 1961. (Year: 1961).*

Baroni, Marco, and Alessandro Lenci. "Distributional memory: A general framework for corpus-based semantics." Computational Linguistics 36.4 (2010): 673-721. (Year: 2010).*

Banchs, Rafael E., and Marta R. Costa-Jussà. "A non-linear semantic mapping technique for cross-language sentence matching." International Conference on Natural Language Processing. Springer, Berlin, Heidelberg, 2010. (Year: 2010).*

* cited by examiner

SYSTEM FOR MACHINE TRANSLATION

FIELD OF THE INVENTION

The invention relates to machine translation systems and methods in general and particularly to machine translation systems and methods that employ an interlingua.

BACKGROUND OF THE INVENTION

The principle of diminishing returns is evident in recent advances in machine translation (MT). Each new level of complexity requires significant work for little gain. Examples include Good-Turing smoothing, syntactic-tree reordering, weighted finite state machines. Each new strategy provides a small bump in quality, but also raises a question invoking memories of Ptolemy's circles on circles: Are we "adding epicycles" to an overly complicated model? Is there a different model which is sufficiently expressive to describe language, yet having lower complexity? Newton's model was better than Ptolemy's not only because it was more accurate, but because it was simpler.

The study of any complex field often begins with a model. Once proposed, the model is applied and tested. For instance, human language can be modeled with a context-free generative grammar. The model can produce any acceptable phrase in most human languages, but it also generates many unacceptable ones. In order to save the model, tweaks and complications must be added. One may add components to such a model to make it more accurate, but at the cost of becoming cumbersome. Such is true of currently leading MT systems, including but not limited to Google Translate and Skype Translate.

Some leading systems also employ convolutional neural networks (AKA deep learning). Such systems have a deep weakness which makes them much more challenging to integrate into future artificial intelligence (AI) systems: they are black boxes. Their inner workings defy human analysis because of the sheer number of connections between the nodes (the computational units within a neural network).

Just as Newton sought a simpler theory for the movement of physical bodies, and his theory led to a plurality of sciences and technologies, a simpler theory of human language will lead to a plurality of language technologies, beginning with MT.

Commonly-known languages are not representative of the full spectrum of human possibility. The availability bias may lead some researchers to overemphasize linguistic features such as rules governing part of speech (PoS). Significant effort has been expended over converting one language's PoS rules to another's. Interesting and broadly-useful mathematical constructs such as tree-transducers have been soundly developed, but can concentrate focus and work on linguistic features that do not always lead to accurate parsing. Misapplied focus (such as on PoS rules) may be indicative of how we choose to see language—as opposed to how the human brain generates it. For example, in many languages, words are inflected (having alternate forms) based on other things than part of speech. It is commonly known that inflections can be determined by tense (e.g. present, past), mood (e.g. subjunctive, conditional), person (first, second), and case (e.g. genitive, accusative). It is less known, and often more associated with less-influential languages, that some of the features that can affect inflection include animacy (animate or not), and shape (e.g. ball-shaped, rod-shaped, flat-shaped). There are a host of other features as well, proposed by various linguists, including but not limited to agency, associated motion, aspect, clusivity, comparison, definiteness, evidentiality, focus, gender, honorifics, mirativity, modality, noun-class, number, polarity, specificity, telicity, topic, transitivity, valency, voice, volition, and even whether or not the subject of a sentence loves the object in the case that the object is a person.

In many cases, the salient problem is that language models have excessive expressive capacity over a space of semantically unimportant features. One strategy to avoid this is to maintain an acute awareness of the diversity among small population languages. By virtue of being less influential, they have features that didn't spread to other more commonly-spoken languages. Small-population languages can have rare and surprising features. Nahuatl has transitive nouns and split possessives. Some dialects of Euskera (Basque) have a unique suffix which is only used when the subject of a sentence loves the object of the sentence (and the object is a person). Including the study of small population languages in a larger study can indicate deeper truths about human language and can lead a researcher to not be rigid in places where the model should be flexible.

Any developer of a multilingual MT system will arrive at the same truth of combinatorics: to enable translation between N languages, the MT system must have either N(N−1) translators, or alternatively N translators with a two-step process using an interlingua, resulting in a star-schema having the interlingua at the center. Google Translate, for instance, puts a human language at the center, using English for an interlingua. German to Spanish translation requires two steps: German->English->Spanish. For some low-data languages (e.g. Catalan), Google chose to use a similar but high-data language as a secondary interlingua, in this case Spanish. Therefore, translating from German to Catalan requires three steps: German->English->Spanish->Catalan. Information is lost in each step because no single human language perfectly encodes all the information of any other language.

There is a need for improved systems and methods for performing machine translation.

SUMMARY OF THE INVENTION

In one aspect, a system for translation from a first language to a second language is provided. The system includes one or more processors and one or more non-transitory memory units coupled to the one or more processors storing computer readable program instructions. The computer readable program instructions configure the one or more processors to perform the steps of: receive an input representation of information in the first language; convert the input representation of information in the first language to one or more sets of one or more marked-lemma dependency trees (MDTs); convert the one or more sets of one or more marked-MDTs to a representation of information in the second language; and output the representation of information in the second language.

In another embodiment, the one or more sets of one or more marked-MDTs is associated with an interlingua, wherein the interlingua is not a human language. The interlingua can be either an alphabet and grammar (similar to a human language), or a mathematical structure. The interlingua could in some embodiments be no more than a set of numbers.

In yet a further embodiment, each of the one or more marked-MDTs includes a tuple (N, E, T), in which N is a set of one or more nodes n, wherein each of the one or more nodes n includes a tuple(x, a, m) in which x includes coordinates of the node n in a semantic space S, wherein S is one of a plurality of semantic spaces in a configuration selected from one of: singular semantic space, nested semantic spaces, parallel semantic spaces, or a combination thereof, a is a string tied to a single alphabet α, and m includes a set of information about the node comprising one or more of: part of speech, inflection, tense, person, mood, case, animacy, shape, case, theta role, and position within a MDT, E is a set of one or more directed edges, either identical or differentiated by type, between coordinates x∈S of the one or more nodes n in N, and, T is a topic stack ("stack" used broadly; in this case it does not restrict access to the top element).

In one more embodiment, the one or more sets of one or more marked-MDTs include a first set of marked-MDTs associated with the first language and a second set of marked-MDTs associated with the second language.

In another embodiment, the system further includes computer readable program instructions that configure the one or more processors to further perform the steps of convert the first set of marked-MDTs associated with the first language to a set of marked-MDTs associated with an interlingua, wherein the interlingua is non-human language; and convert the set of marked-MDTs associated with the interlingua to the second set of marked-MDTs associated with the second language.

In another embodiment, at least one of the representation of information in the first language and the representation of information in the second language includes one or more of: linguistic data, visual imagery, a video stream, an auditory stream, a curated database, a haptic interface signal, a simulated object, an avatar, a virtual reality phenomenon, a video game, sensory input, motor or activator status, motor or activator control.

In another aspect, a computer-implemented method for translation from a first language to a second language is provided. The method includes: receiving, by a computer, an input representation of information in the first language; converting, by the computer, the input representation of information in the first language to one or more sets of one or more marked-lemma dependency trees (MDTs); converting, by the computer, the one or more sets of one or more marked-MDTs to a representation of information in the second language; and outputting, by the computer, the representation of information in the second language.

In one embodiment, the one or more sets of one or more marked-MDTs is associated with an interlingua, wherein the interlingua is a non-human language.

In another embodiment, each of the one or more marked-MDTs includes a tuple (N, E, T), in which N is a set of one or more nodes n, wherein each of the one or more nodes n includes a tuple(x, a, m) in which x includes coordinates of the node n in a semantic space S, wherein S is one of a plurality of semantic spaces in a configuration selected from one of: singular semantic space, nested semantic spaces, parallel semantic spaces, or a combination thereof, a is a string tied to a single alphabet α, and m includes a set of information about the node comprising one or more of: part of speech, inflection, tense, person, mood, case, theta role, animacy, shape, case, and position within a MDT, E is a set of one or more directed edges, either identical or differentiated by type, between coordinates x∈S of the one or more nodes n in N, and, T is a topic stack.

In yet another embodiment, the one or more sets of one or more marked-MDTs include a first set of marked-MDTs associated with the first language and a second set of marked-MDTs associated with the second language.

In still another embodiment, the method further includes the steps of: converting, by the computer, the first set of marked-MDTs associated with the first language to a set of marked-MDTs associated with an interlingua, wherein the interlingua is a non-human language; and converting, by the computer, the set of marked-MDTs associated with the interlingua to the second set of marked-MDTs associated with the second language.

In a further embodiment, at least one of the representation of information in the first language and the representation of information in the second language includes one or more of: linguistic data, visual imagery, a video stream, an auditory stream, a curated database, a haptic interface signal, a simulated object, an avatar, a virtual reality phenomenon, a video game, sensory input, motor or activator status, motor or activator control.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Glossary

Figure 1:
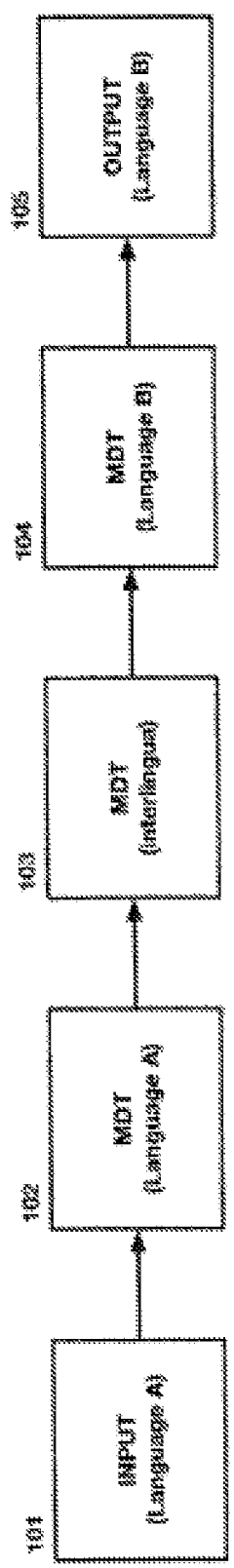
FIG. 1 shows an overview of the system's functions, according to some embodiments of the present invention.

A list of defined terms and their usual meanings in the present document (unless otherwise explicitly stated to denote a different thing) are presented below.

human language: a language that is (or was) used by humans in a form selected from but not limited to speech, text, images, signs (such as American Sign Language), facial expressions, body positions or motions, and combinations thereof in any form, including real time communications, and recorded communications.

interlingua: a non-human language that is represented in a format suitable for use with a general purpose programmable computer that operates under the control of a set of instructions recorded on a machine-readable medium.

graph: from Graph Theory, a set of vertices (points) and edges (lines connecting the points). Vertices may have zero edges connected to them, but every edge exists only to connect exactly two vertices, and any two vertices may share only one edge between them.

path: a sequence of edges which connect a sequence of vertices cycle: a path containing the same vertex more than once connected graph: a graph in which there exists a path between any two vertices acyclic graph: a graph in which there does not exist a cycle tree: a connected acyclic graph in which any two vertices are connected by exactly one path directed graph: a graph in which each edge has an associated direction, typically indicated with an arrow instead of a simple line.

path (in a directed graph): a path as defined before, but with the restriction that all vertices, except the initial and final, connect the end of one edge to the start of another, i.e. all path segments point the same direction.

directed tree: a directed graph in which any two vertices would be connected by exactly one path if direction were ignored.

rooted tree: a directed tree such that there exists only one vertex, called the "root," that can be reached from any other vertex, following only directed paths.

dependency tree: a rooted tree having a single word at each vertex, such that each word points to the word it "depends on", with the "head verb" at the root of the tree, consistent with common practice in Linguistics traced back to Tesnibre.

lemma: a base word, representing the core meaning of a larger set of words and/or inflections, e.g. "to go" is the lemma for "go," "going," "went," and "gone."

semantic: of or related to meaning.

semantic element: a concept which can be represented in human language.

semantic space: a high-dimensional mathematical space representing a distinct semantic element on each axis. The potential geometries of this space may include but is not limited to Euclidean, hyperbolic, and elliptical.

isomorphic: functionally equivalent. A is isomorphic to B under a transformation T if the parts within A have the same interrelationships as do the parts within B kernel: a mathematical mapping graph: a mathematical representation from Graph Theory employing nodes (AKA "vertices") connected by links (AKA "edges") which may or may not be directed (arrows in place of simple links)

tree: directed acyclic graph entity: a specific person, place, thing, organization, idea, and any of but not limited to: concepts represented by Wikipedia pages, art pieces, machines, foods, animals, and plants percept: perceived input, whether auditory, visual, linguistic, or other encoding: a mathematical representation of a concept, a percept, or any collection thereof vector: an array of integers or floats pose vector: an orientation of some entity in some vector space tensor: a multidimensional array of integers, floats, complex numbers, qbits, or any other concept of mathematical value vectorization: the process of converting or mapping to a vector space or a tensor space from any of but not limited to a word, a sense, a percept, a set of text, a concept, or an entity embedding: a dictionary or a function that vectorizes any of but not limited to words, senses, sets of text, percepts, concepts, entities knowledge base: a mathematical representation of entities that attempts to describe their attributes and relationships with each other document store: a database designed to store records having a flexible set of fields graph database: a database designed to store entities and the relationships between them topic: a potentially relevant semantic element represented by a node. The topic of a sentence could be one of but not limited to: subject, object, theme, subject matter, domain.

topic stack: a sorted list of topics node: an object in computer memory which serves to place a lemma in a semantic space, having 1.an associated language, 2.a linguistic representation of the lemma in its associated language (e.g. unicode text), 3.coordinates in a semantic space. The associated language may be "interlingua," which is only used internally. The linguistic representation for an interlingua node may be NULL or come from any human language. All nodes have coordinates.

marked node: a node which has been appended with sufficient linguistic information to recreate, from its lemma, the appropriate inflection, declination, or other instantiation, such as taking the lemma "to go" and appending: (noun, 2nd person, past tense).

marked-lemma dependency tree (MDT): a dependency tree with an associated topic stack, but having a node at each vertex instead of a word. An MDT comprises nodes associated with exactly one language or the interlingua. English nodes may compose an English MDT. Interlingua nodes would compose an interlingua MDT.

language model: a function between the set of all possible combinations of N words and the range [0,1], where N is an integer. In the current state of the art, values for N do not typically exceed 5.

tree model: a function between the set of all possible trees composed of N vertices, and the range [0,1].

anaphora: an expression, the interpretation of which depends on another expression in the text. For example, in the phrase "John loved his dog," we interpret "his" to mean that "John" (the only male mentioned in the scope) is the one possessing the dog. Note: depending on order, some such instances are called "cataphora" or "endephora."

anaphora resolution: the process of determining which pronouns and other linguistics expressions refer to something else in the text, and precisely what.

polysemy: multiple meanings being attributed to a single word.

theta role: a well-known linguistic model of argument structure

The present disclosure relates to machine translation (MT). An MT system is one that takes some form of input, which often is linguistic input such as text or speech, in some initial language, language A, such as English, and produces output in some other language B, such as Spanish or Chinese, such that the meaning of the input in language A is congruent with the meaning of the output in language B. The input can be of any form that can be generated by a human in using human language. In some embodiments, the output can be in the same form as the input. In other embodiments, the output can be in a different form than the input or can be in any form that is recognizable by a human as a communication that has been originated by another human. In general, an MT system performs the function of a human translator. It is contemplated that MT systems and methods according to principals of the invention may be able to perform functions that a human translator cannot perform, such as recognizing input in a human language and providing a control signal in a machine-control language or protocol, so that a human provides input which is used to control the operation of some device or system, such as by way of example, a mechanical device, an electrical system, an electronic system and combinations of systems, such as a car, a home appliance, a machine used in manufacturing, or other devices.

Taking cues from Tesnihre, Chomsky, Langacker, and others, a digraph-based interlingua might represent a simpler model for MT than the prior art models.

Examples of the problems addressed by the disclosed invention are accuracy and simplicity. Accuracy is the metric of highest value to most in the MT industry. Simplicity is of high value to researchers in the AI industry. The disclosed invention will provide not only a more accurate MT service, but also a scaffolding upon which a host of AI applications can be built.

The disclosed method for MT can be embodied in a set of interfacing software programs, each performing identical or complementary functions, running on an individual or a plurality of processors. Let such a functional embodiment be hereon called "the MT system" (700).

First, a mapping function from a linguistic representation in language A generates a set T of interlingua MDTs. Given an input text $I_A$ in some initial language A, the system parses $I_A$ into a set of dependency trees $D_A$. Each dependency tree $D_{Ai}$ in $D_A$ is distinct, and in most cases carries a distinct meaning, and has an associated weight which indicates the system's rating of the accuracy of that tree. From each dependency tree $D_{Ai}$, a set $T_{Ai}$ of language-A MDTs is generated in a similar fashion where, given $D_{Ai}$ ("given" in the Bayesian sense), each language-A MDT $T_{Aij}$ has an associated weight. From each language-A MDT $T_{Aij}$ in the set $T_{Ai}$, a set $T_{Iij}$ of interlingua MDTs is generated where, given $T_{Aij}$, each $T_{Iijk}$ in the set $T_{Iij}$ has an associated weight.

Second, another mapping function takes a set, or a set of sets, of interlingua MDTs, and generates linguistic output in language B. From each interlingua MDT $T_{Iijk}$, a set $T_{Bijk}$ of language-B MDTs is generated, where, given $T_{Iijk}$, each $T_{Bijk}$ in the set $T_{Bijk}$ has an associated weight. From each language-B MDT $T_{Bijkl}$, a set $D_{Bijkl}$ of language-B dependency trees, each has an associated weight. From each dependency tree $D_{Bijklm}$ in the set $D_{Bijkl}$, a set $O_{Bijklm}$ of linguistic outputs in language B is generated, each with an associated weight. The output with the highest weight is then selected.

Due to the high branching factor of the system as described above, computational limits will be an important consideration. At each step in the process, tree models, specific to a number of features including but not limited to language, context, and type of tree or MDT, will be used to prune each output set.

FIG. 1 shows an overview of the system's functions, according to some embodiments of the present invention. Linguistic input 101 in some language A is converted to a set 102 of MDTs where each node in each MDT is associated with language A, thus they are called "Language-A MDTs". In some embodiments, the linguistic input 101 in language A may be inputted into system 700 or otherwise captured by system 700 using an input device, described below in connection with FIG. 7. The Language-A MDTs may be converted to a set 103 of interlingua MDTs. The set 103 of interlingua MDTs may then bee converted to a set 104 of Language-B MDTs. The set 104 of Language-B MDTs may be converted to linguistic output in language B. In some embodiments, the linguistic output in language B may be displayed in a graphical user interface of a display device, such as described below in connection with FIG. 7.

Figure 2:
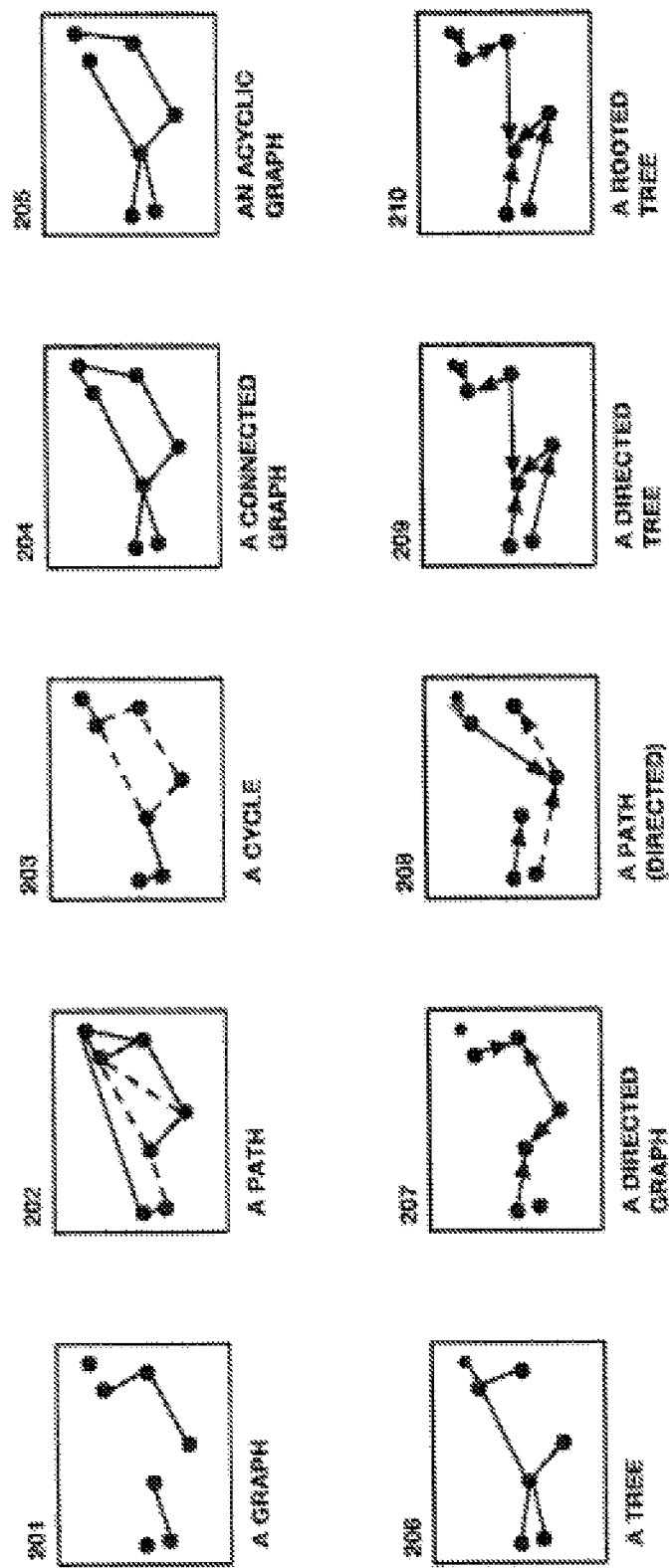
FIG. 2 shows several foundational concepts important to the system, according to some embodiments of the present invention.

FIG. 2 shows several foundational concepts important to the system, according to some embodiments of the present invention. Element 201 is a simple graph—a set of vertices, some of which are connected by edges. This and following concepts come from Graph Theory. Element 202 is a graph with a path indicated with dashed lines. The dashed lines are merely there to distinguish the edges in the path from those not in the path. Element 203 is a graph with a cycle indicated with dashed lines. Element 204 is a connected graph. Element 205 is an acyclic graph. Element 206 is a tree. Element 207 is a directed graph, in which each edge has a single defined direction. Element 208 is a directed graph with a path indicated by dashed lines. Element 209 is a directed tree. Element 210 is a rooted tree, which differs from 209 in the direction of merely one edge.

Figure 3:
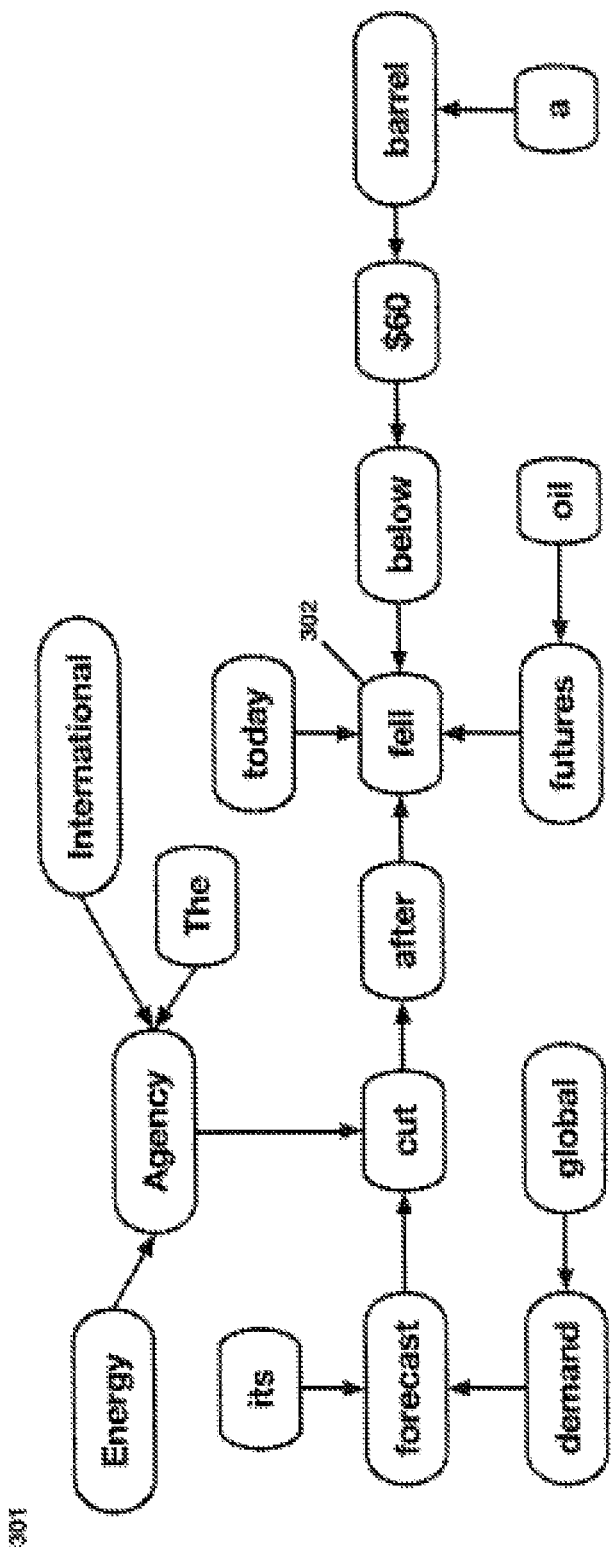
FIG. 3 shows a sentence 301 and its related parse into a dependency tree, according to some embodiments of the present invention.

FIG. 3 shows a sentence 301 and its related parse into a dependency tree, according to some embodiments. The root 302 of this tree is the head verb, "fell." In some embodiments, sentence 301 may correspond to the linguistic input 101 in the English language, as described above in connection with FIG. 1. In some embodiments, the root of the dependency tree is the code corresponding to the "head" verb of a sentence. In Linguistics, the head verb of a sentence is the verb on which all other elements depend within the clause on which all other clauses depend. The present invention may rely on one or more algorithms for constructing the dependency tree, such as the algorithms described by Covington [Proceedings of the 39th Annual ACM Southeast Conference (2001), pp. 95-102], and those described by Nivre et al. [CoNLL 2006, pp. 221-225] and Hall et al. [CoNLL 2007, pp. 933-939, Prague], incorporated herein by reference.

Figure 4:
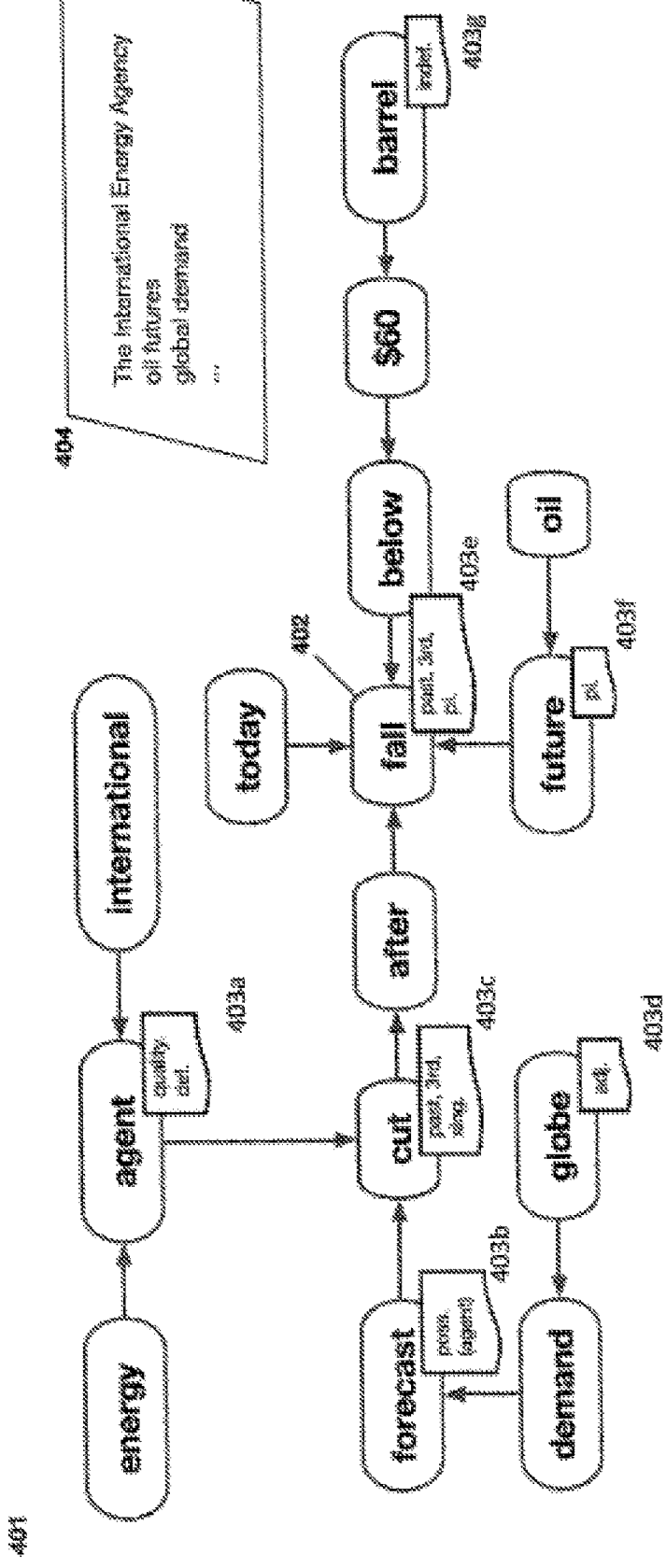
FIG. 4 shows the sentence from FIG. 3 and its related parse into an English MDT, according to some embodiments of the present invention.

FIG. 4 shows the sentence from FIG. 3 and its related parse into an English MDT, according to some embodiments of the present invention. FIG. 4 has fewer nodes than FIG. 3, but more information in the marks 403a-g on each node. The head verb 402 is represented by a node which has the lemma "fall" whereas 302 in FIG. 3 had the conjugated form "fell." Information about a number of nodes is contained in marks e.g. 403a-g. The mark 403a indicates that the node is "definite" (one would put a definite article before it in a sentence, such as "The . . . "). This mark 403a also includes "quality," indicating that the word should be inflected. For example, the lemma "agent" should be replaced with a word meaning "the quality or state of being an agent" i.e. "agency." The mark 403b includes "poss, (agent)," which means it is in a possessive relationship with the agent node, i.e. the "forecast" is the agency's forecast. The mark 403c includes "past, 3rd, sing.," which means it should be inflected to past tense 3rd person singular. The mark 403d includes "adj.," which means adjective. The mark 403e includes "past, 3rd, pl.," which means past tense 3rd person plural. The mark 403f includes "pl.," which means plural. The mark 403 g includes "indef," which means indefinite, as in an indefinite article, e.g. "an." A person of ordinary skill in the art may appreciate that the marks illustrated in FIG. 4 are examples, and that a plurality of additional marks and combinations of marks may be used for each node of the MDT or a subset of the nodes of the MDT.

Element 404 is the topic stack. The topic stack 404 may be considered a running tally of the most salient subjects and objects in the current discourse. These topics may come from the current sentence, any nearby sentence or paragraph, the document, a class of documents, or information gained elsewhere. In some embodiments, the topic stack may be comprised of the most salient entities mentioned within the current scope of the text, where "scope" refers to a region of text within which the reader or listener can reasonably expect arbitrary anaphora resolution, e.g. if a pronoun is used, the scope is how far a reader might look to interpret its meaning. The present invention, in its use of the topic stack, may rely on algorithms used to extract salient entities from text, such as those mentioned by Dunietz and Gillick [Proceedings of the European Association for Computational Linguistics 2014], incorporated herein by reference.

Figure 5:
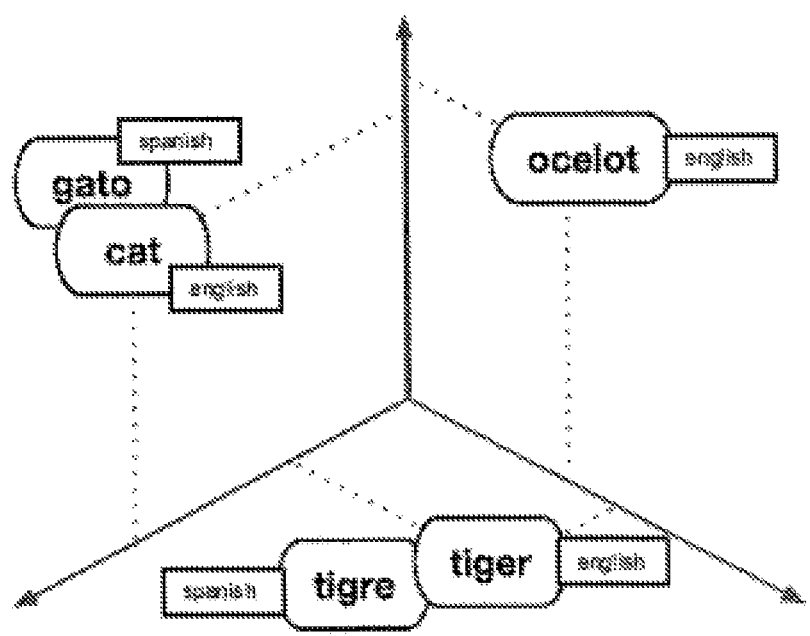
FIG. 5 shows three selected dimensions from a semantic pair, according to some embodiments of the present invention.

FIG. 5 shows three selected dimensions from a semantic space, according to some embodiments of the present invention. Several nodes from English and Spanish are plotted on the three dimensions. These nodes are near each other because they are related in meaning. In the MT system 700, relative distance between nodes within a semantic space may be treated as a function of relatedness. Nodes that are closer together in a semantic space may be treated as though the lemmas they represent are closer in meaning as well. Note that each node in an MDT may correspond to a lemma or word. In some instances, there may be inflections of a lemma that indicate a meaning too distinct from other inflections and therefore merit a node solely for that particular inflection, e.g., "drink" vs. "drunk."

Figure 6:
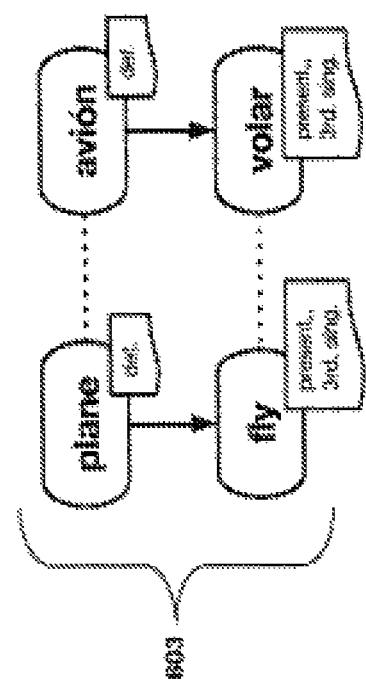
FIG. 6 shows a short phrase that was incorrectly translated from English to Spanish, according to some embodiments of the present invention.
Figure 6:
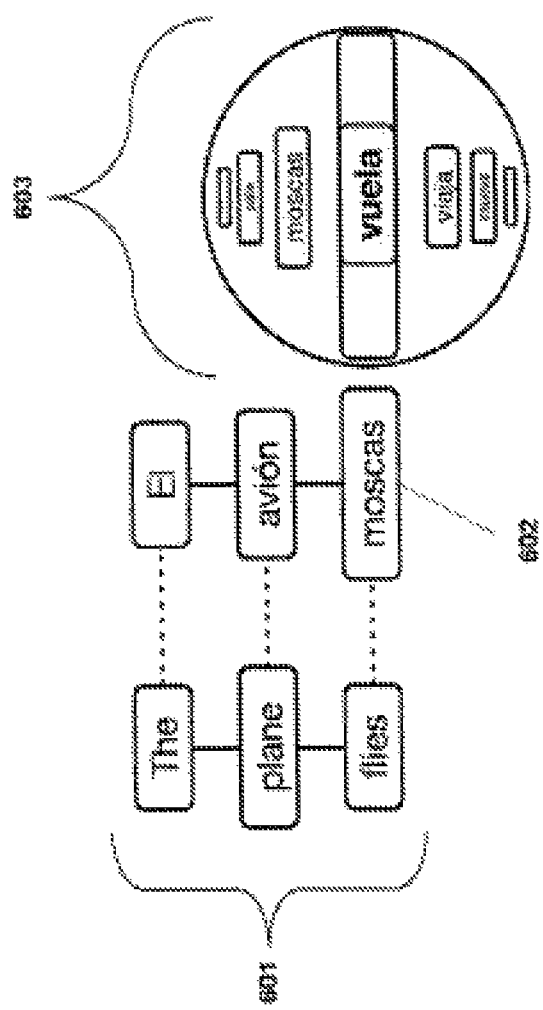

FIG. 6 shows a short phrase that was incorrectly translated from English to Spanish, according to some embodiments of the present invention. FIG. 6 then shows how a user might offer a correction in element 603. FIG. 6 then shows the corrected internal MDTs 603, implying that the system has been improved. In some embodiments, element 601 is what the user might see on a graphical user interface on a display device of MT system 700, the original translation, "The plane flies"->"El avión moscas." In some embodiments, MDTs may not be presented to a typical user because of their visual complexity. Element 602 is the translation mistake; "moscas" is the plural for the insect "mosca," a fly. In some embodiments, element 602 is what the user might see on a graphical user interface on a display device of MT system 700 after submitting the initial English input for translation into Spanish. In some embodiments, element 603 is an example representation of a list of alternate words that may be presented to the user in a quick and simple manner on the graphical user interface. If the user selects "vuela" (present tense 3rd person inflection of the verb "to fly") using an input device, then the system 700 can use this information to improve future function. The exact process being improved is either the conversion from English MDTs to interlingua MDTs, or interlingua MDTs to Spanish MDTS, or both. In some embodiments the system 700 incorporates user feedback by positing a new MDT conversion that has a higher likelihood of being true given the feedback. In other embodiments the user can interact using an input device visually with the MDT in a graphical user interface to replace or adjust nodes.

Figure 7:
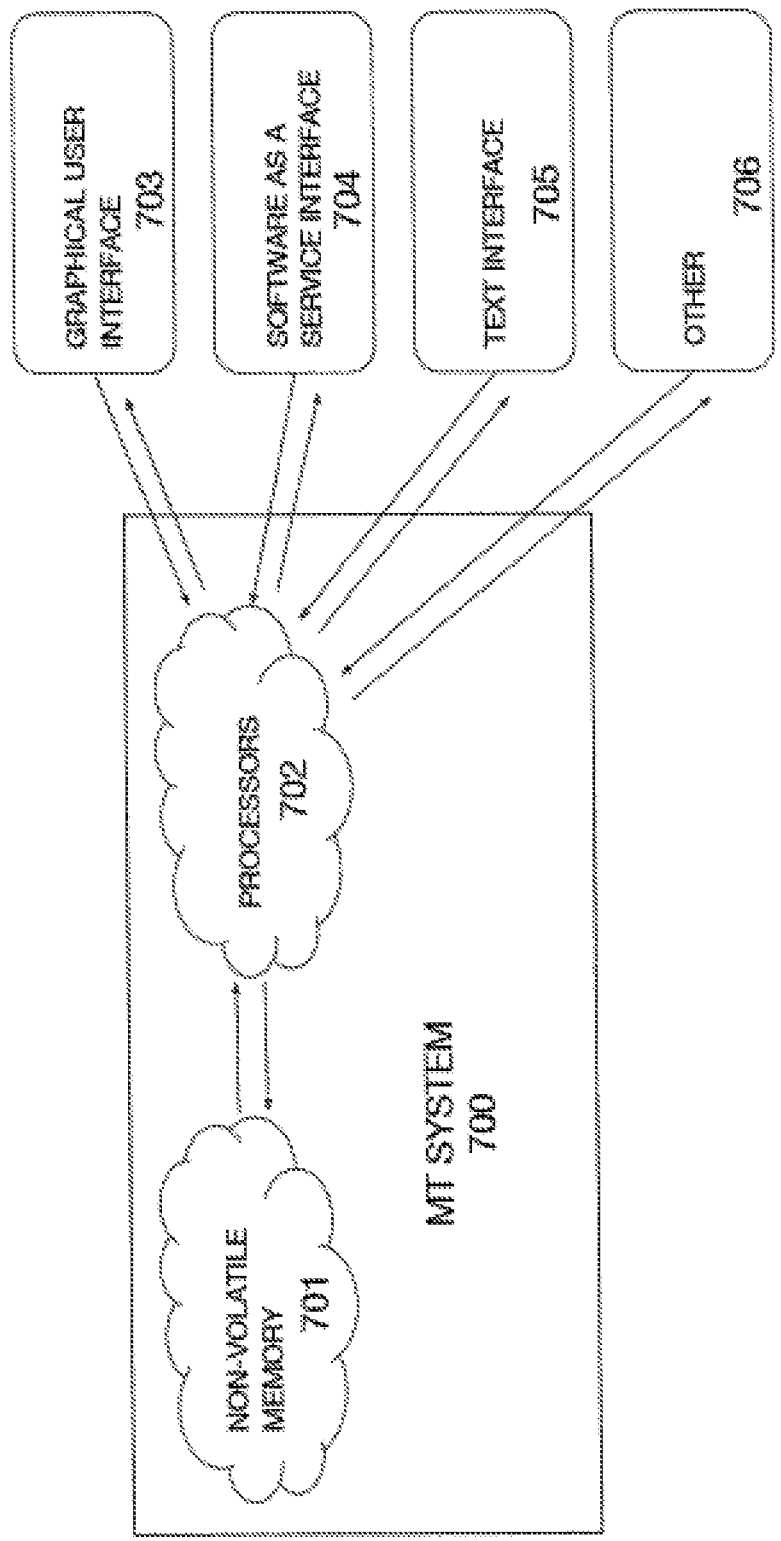
FIG. 7 is a block diagram of a machine translation system, according to some embodiments of the present invention.

FIG. 7 is block diagram of a machine translation system, according to some embodiments of the present invention. All arrows indicate the transference of information. Any of the listed components 701-706 could reside in any information storing and/or processing system anywhere in the world. The information transference indicated by the arrows could be mediated by any possible communication medium including but not limited to the bus on a motherboard, network connections, and WiFI. As shown in FIG. 7, MT system 700 may include or consist of: a non-volatile memory component 701, and a set of processors 702. The memory 701 will in some embodiments be an independently-scalable distributed memory system, (e.g. Hadoop Distributed FIle System, Spark Resilient Distributed Dataset). The processors component 702 will in some embodiments be an independently-scalable set of computation nodes (e.g. auto-scaling cluster on a service such as Amazon Web Services EC2), which could heterogeneous and running complementary software. Interaction with the MT system could be initiated in a graphical user interface (GUI) 703 where text is input along with a desired target language. This information is sent to the processors 702 which either at that time or before load the necessary information and programs from the memory 701 and perform computations consistent with the disclosed invention description above. The output is then sent to the GUI 703 and there displayed to the requestor. The MT system 700, even the same embodiment, could support interaction with other endpoints, such as software as a service (SaaS) 704, a text interface 705, and other forms not specified here, including but not limited to printed matter, speech, Braille, haptics, knowledge bases, video games, sentiment, and any form of text, processed or unprocessed. When a translation request is initiated at a SaaS 704 endpoint, the request is sent in a method consistent with common SaaS practice, such as sending in JSON or XML, with a similar output being sent back. When a translation request is initiated at a text interface 705, the requestor is interacting with a command-line program as is typical in Linux systems today.

Sets of Marked-Lemma Dependency Trees as Interlingua for Machine Translation

A methodology for parsing text from some language A into rooted acyclic dependency digraphs, or dependency trees, having lemmas as nodes and attributes associated with said nodes will now be described. Such is termed a Marked-Lemma Dependency Tree (MDT). Mapping to similar trees from some target language B provides sufficient limits within meaning space as to generate an unbounded but finite set of nodes with which non-language specific MDTs may be generated as an interlingua.

The principle of diminishing returns seems to apply to MT. Each new level of complexity requires significant work for little gain. Examples include Good-Turing smoothing, syntactic-tree reordering, weighted finite state machines. Each new strategy provides a small bump in quality, but also raises a question invoking memories of Ptolemy's circles on circles: Are we "adding epicycles" to an overly complicated model? Is there a different model which is sufficiently expressive to describe language, yet having lower complexity? Newton's model was better than Ptolemy's not only because it was more accurate, but because it was simpler. Taking cues from Tesniere, Chomsky, Langacker, and others, the disclosed invention is a simpler mathematical construct yet sufficiently expressive.

For the purpose of providing context, a few concepts and strategies are described below. The novel aspects of the disclosed invention are discussed that are essential to a functioning embodiment.

Analogy to Number Theory

Number theory begins with basic functions (e.g. the successor function: s(1)=2). Assuming the existence of 0, all natural numbers (1, 2, 3, . . . ) are defined by the successor function. In the common parlance, we refer to the output of the successor function as being "higher" than its input, but this is a judgement and intuition. The salient feature of natural numbers is that they are each distinct. They are related to each other via the successor function. The intuition that some numbers are "higher" or "lower" is a useful intuition but not strictly necessary for the theory to remain self-consistent. Finding proofs in number theory often demands that one puts aside their intuition.

In a similar fashion, the disclosed invention may act under the premise that any and all semantic elements may be treated as merely distinct elements, without regard to their relationships to one another. The words "father" and "son" can be represented by distinct nodes in a semantic space without representing any information describing intuitive facts about these words, such as the fact that one is senior to the other. Unlike the natural numbers, however, semantic elements will not be equidistant from their neighbors.

Analogy to Sparse Distributed Representations

Sparse Distributed Representations (SDR) were proposed as a computer model of human memory by Jeff Hawkins, founder of the Redwood Center for Theoretical Neuroscience. Each concept being recorded in memory would comprise a series of many thousands of bits (a sequence of 1's and 0's). It is described as "sparse" because each representation includes very few 1's, implying that all other bits are 0. This representation is powerful because each bit has semantic meaning. The location of each bit in the sequence holds a distinct semantic significance. Only bitwise operations are used to compare two SDRs, not bit-shifts. If two SDRs differ by only one bit, then they represent two very similar concepts. If they differ by two bits, they are less similar. In this way SDRs can model relatedness.

The disclosed invention may use a sequence of floating point numbers, each between 0 and 1, representing a coordinate in a dimension. Like SDRs, the length of the sequence is also very long. The upper bound on the number of dimensions is the number of semantic elements the system is able to translate. The disclosed invention may also exhibit sparsity in that most nodes will have a zero coordinate on most axes.

Complexity Classes and Complicated Rule Sets

Linguists have dedicated significant effort toward describing human languages under the rubric of Chomsky's hierarchy of languages. Many linguists agree that human languages are of the class "Context Free," with the possible exceptions of Bambara, Dutch, and Swiss-German, which some claim to be of the "Context Sensitive" class. The implication is that human languages can each be described as a set of strings of characters which can be output from a generative grammar of the appropriate complexity class, and that the corresponding automaton (e.g., push-down automaton for context-free languages) can correctly accept strings within the language and reject those that are not.

Complicated and often inefficient rulesets have been developed because researchers were convinced by the above mathematical understanding of the foundations and possibly the bottom-up motivations of sentence and phrase formation in human language. The disclosed invention may operate under no firm understanding that human language is context-free or context-sensitive, but may be informed by such frameworks.

Expressive Power and Focus

A model of human language is powerful, useful, and efficient, if it exhibits a high diversity of disambiguated states when such diversity corresponds to highly meaningful semantic diversity, and low diversity when it corresponds to non-meaningful diversity, or as the layman would say it, "not make a mountain out of a molehill." Language models that rigorously adhere to a context-free or context-sensitive generative grammars are sometimes prone to exactly that. Significant effort can be expended to make distinctions without a difference.

One advantage of the disclosed invention is that it is able, with the least amount of effort, to fully express a difference when a linguistic difference represent a semantic difference. The disclosed invention does not have the weakness of being forced to perform many redundant computations that all correspond to the same semantic combination.

Referents and Topics

One of the most challenging problems in natural language processing (NLP) is that of anaphora resolution, i.e., matching pronouns and other words to the nouns to which they refer. Consider the sentence, "Remove the charger from your computer and fix it." Precisely what is being fixed? the computer or the charger? English is not systematically clear in such situations. Typically the listener chooses a referent based on other knowledge.

The disclosed invention may use the "topic stack" to select the most important nouns with respect to a given sentence or phrase. It can sort them based on possible importance or salience, based not only on the current sentence but nearby ones or even the current or other paragraphs or the enclosing document. It may not be perfect or even match human performance, but it will make more well-informed decisions than current systems because it will generate potential MDTs to represent a sentence, where each MDT may have a unique solution to the anaphora resolution problem, and then consult the topic stack to choose the most likely MDTs. Knowing which topics are most salient in a given context will inform the system in selecting which noun is being referred to by a pronoun. This strategy will be particularly useful when the referent isn't even mentioned in the sentence. This same strategy applies to more than just noun/pronoun ambiguity. It applies to the resolution of any other referent ambiguity a sentence or set of sentences may allow.

Entity Linking

Many technologies and strategies are used for entity linking from text (i.e., parsing and recognition of proper nouns). The invention could employ any of these existing or new technologies. They are employed in the function of the system because each distinct proper noun could warrant its own dimension in a semantic space or in some embodiments merely a unique identifier, e.g., Wikidata QID.

Language Models

Language models are one of the most common tools used to parse and interpret natural language. The typical language model is a set of probabilities P (S|n), the probability that a specific n-gram (S) will be observed in a given sequence of n words.

If n=1, one is referring to a 1-gram language model that describes the probability that any single word will appear. There is often a different 1-gram language model for the initial word, final word, and other words in a sentence. Considering an English initial-word 1-gram language model, a set of probabilities P (S|1, initial), words like "A" and "The" have a relatively high probability in the language model; much higher than "Alaska," for instance: P ("Alaska"|1, initial)<P ("The"|1, initial).

Along with language models, many current systems employ part of speech (PoS) and tree parse models. PoS typically select less than one hundred PoS tags (e.g., noun, proper noun, verb, . . . ) and outputs the text with only parts of speech added in an annotation format of some kind. Tree parse models take text as input and output a "parse" of the text, i.e., head verb at the root of a tree, modifiers as branches, participles as branches with branching of their own, like subtrees. PoS and parse models are "taught" from human-tagged data, i.e., humans spend significant time annotating large corpora of text with parts of speech or structuring them into parse trees. Such systems automatically "learn" from this data.

The disclosed MT system 700 is able to employ standard language models, PoS models, and tree models as needed, along various levels of "back-of". Each of these types of models is useful at points in the processing from input text, to MDTs. Back-off is a machine learning tactic which is used when highly specific data either isn't available or doesn't produce good results. Consider the case where one is attempting to PoS-tag the last word in a substring having 3 words found in the participle "it was lead". Let us say that the model has high confidence about the first two and tags them, putting the tag after a slash: "it/pronoun was/verb-past lead". The PoS model has an associated probability with each known PoS for the word "lead." It cannot confidently choose one outright because it is often a verb and often a noun. The model must consider context. If the model has an associated probability of the 3-gram "it/pron was/verb-pt lead/noun" (tags included), then problem solved. If, however, the model does not have numbers for so specific a situation, it must "back-off" to a more generalized "it/pron was/verb-pt X". X can be any word. After analyzing all human-tagged 3-word participles beginning with "it was", the system will have an associated probability with the last word being each of the known parts of speech. It will hopefully, with high confidence, select 'noun'.

Beam Search

Beam search is another typical tactic in machine learning, and specifically natural language processing challenges such as speech recognition. A "branching" is when a model must consider multiple possibilities. A model that must consider many possibilities simultaneously, and must exponentially consider sub-possibilities, is said to have a "high branching factor." Beam search is important because it limits the branching factor such that at each branching, only the top n possibilities are kept, and each of those possibilities is closely monitored and rated so that it may be dropped whenever its likelihood goes below a specified level.

Speech recognition, for instance, has many layers: 1. Recognize when a person is speaking vs. non-speech audio, 2. Recognize the divisions between parts of sounds, 3. Recognize sounds, 4. Recognize syllables, 5. Recognize words, 6. Apply n-gram models. At each level multiple possibilities are simultaneously considered until the system overall settles on a final output. Beam search is employed by setting branching limits and confidence thresholds to each step of the multi-layered process.

An embodiment of the disclosed invention can have many layers, including 1. text in language A to parse-tree in A, 2. parse-tree in A to language-A MDT, 3. Language-A MDT to interlingua-MDT, 4. Interlingua-MDT to Language-B MDT, 5. Language-B MDT to parse-tree in B, 6. Parse-tree in B to text in Language B. According to some embodiments, the system may use a different method, using more or fewer steps, to generate the MDTs.

Machine Translation (MT)

MT is a particularly challenging problem in NLP. It is likely more challenging than speech recognition. Speech recognition rates have often been scored above 95% since 2008. No prior art MT system can be trusted to produce accurate sentences in a target language 95% of the time.

Most state-of-the-art MT systems belong to a category known as statistical machine translation (SMT). SMT uses various strategies to parse, reorder, and then replace phrases with translated phrases, with no attempt to extract meaning. These systems learn from parallel documents, sets of paragraphs which have been translated by humans. The problem presented by building a system for n languages is that n(n−1) combinations are possible, meaning that n(n−1) two-way MT systems must be trained from parallel documents representing each pair. The unfeasibility of finding enough such documents, and the exponential computational requirements of building such a high number of systems, has led most researchers to a star configuration having an "interlingua" in the center, requiring the development of a mere n−1 bidirectional MT systems. The interlingua chosen by Google Translate is English, with the added level that some languages (e.g. Catalan) must be translated through a secondary interlingua (Spanish, in this case).

Some systems, including Google Translate, also employ a strategy known as "deep learning," which are convolutional neural networks i.e., sets of neural nets (NN) which are structured, combined, and nested so that each attacks one aspect of a problem. The division of labor, as it were, between the NNs, is often not managed by humans, but rather learned from data. The drawback of using NNs is that they are black boxes. Even when NNs work perfectly, one has no way to understand how it accomplishes what it does, or prepare for when and if it breaks. When NNs fail to perform accurately, they can perform with wild inaccuracies, instead of failing gracefully. Another important drawback to using a black box is that no inferences can be made from the internal representations, because there is no way to connect any external concept or context to an internal representation. There is no way to infer new knowledge from old, and there is no way to connect internal states to real-world objects.

Meaning Extraction/NLU

Meaning extraction is a secondary task and sometimes known as natural language understanding (NLU). Typical SMT systems do not readily enable NLU because of the inherent ambiguity of language. The internal representation is usually just a human language (as Google does with English). There is no attempt to decode or disambiguate potential meanings.

Some NLU systems address this problem by limiting the sets of things a person can say. This strategy is appropriate for command and control systems e.g., voice-command in an automobile, but not for NLU applied to free-form text or speech.

In some embodiments, the disclosed invention is able to disambiguate the possible meanings of a text. Each sentence or phrase is parsed into a weighted set of MDTs, where the "weight" is a number between 0 and 1. Each MDT is composed of nodes that each have exactly one precise definition. When a word or lemma has more than one possible definition or sense, each of those senses would be associated with a distinct node. Therefore, each MDT represents exactly one precise understanding of a sentence or phrase. The weight associated with each MDT signifies how important, relative to the other MDTs, that particular understanding is.

Consider the double entendre, "Marriage is a fine institution, but I don't want to be committed to an institution." The last phrase "committed to an institution", typically refers to a person being forcibly entered into a psychological facility. Humans find this quote humorous because it compares marriage to insanity. The crux of the double-entendre is the first mention of "institution." In some embodiments, for example, the disclosed invention may generate a distinct MDT for each understanding of the phrase "Marriage is a fine institution." On its own, or in another context, the more generally applicable sense of "institution" would receive almost all of the weight. However, having the phrase "committed to an institution" so close by, the topic stack will augment the weight of the asylum-related sense of "institution." Therefore, the double entendre may be represented by two precisely-defined MDTs along with nonzero weights.

Knowledge and Meaning

Intuitive notions of meaning often derive from a common understanding of what "meaning" means. Knowledge representation is typically discussed under a rubric in which internal states are mapped onto external phenomena or sensory patterns. This section describes a structure able to perform the function of the fore-described internal states only. These are semantic elements—like atoms. These constructs may be part of the preferred embodiment of the disclosed invention.

Where: $x_0$ is the origin of some k-dimensional Euclidean space S (the semantic space),
and: $x_i \in S \; \forall i \in Z, \; 0 < i \leq k$,
and: $|x_i - x_0| = 1 \; \forall i \in Z, \; 0 < i \leq k$,
and: $\alpha$ is an alphabet in some language L,
and: $a \in \alpha^*$,
where Z is the set of natural numbers (0, 1, 2, 3, ...)
Let: $n_i$ be the tuple $(x_i, a)$ The terminology "node $n_i$" will refer hereon to the tuple $(x_i, a)$. Each string a is tied to a single alphabet $\alpha$. Therefore, each node is associated with only one language. However, rather than project typical ideas of "meaning" onto $n_i$, the reader is encouraged to consider this as a mathematical abstraction.

These may be the salient features of nodes $n_i$ in S:
each node is associated with a single language
each node is distinct
each node is unit distance from the origin x0 in n-dimensional space
distance between $n_i$,nj ($i \neq j$) can be measured by Euclidean distance: $|x_i - x_j|$
distance between $n_i, n_j$ ($i \neq j$) also measured by angle φi,j at the origin x0
in the maximum entropy (ME) configuration, the distance between any two nodes is $\sqrt{2}$, i.e. $\varphi_{i,j} = \pi/2$
starting at ME, $\varphi_{i,j}$ for $n_i, n_j$ ($i \neq j$), may be altered arbitrarily without affecting distances to any other node Operations on S These operations on S can alter the coordinates $x_i$ of a node $n_i$. Since each node represents a single sense of a single word in a single language, reflected in this structure is an analogy between distance and relatedness. Related concepts are closer to each other in S, and unrelated ones farther apart.

Merge

Define the operation merge($n_i, n_j, x_k$): Given two distinct nodes $n_i, n_j$, associated with the same language, differing only in their coordinates, merge replaces them with a new node $n_k$ having coordinates $x_k$.

$$\text{merge}(n_i, n_j, x_k) \rightarrow n_k$$

Split

Define the operation split($n_i, x_j, x_k$): Given a node $n_i$, split replaces $n_i$ with two nodes $n_j, n_k$, having coordinates $x_j, x_k$. The new nodes are copies of n, except in their coordinates:

$$\text{split}(n_i, x_j, x_k) \rightarrow n_j, n_k$$

The two resulting nodes are both associated with the same language as $n_i$.

Move

Define the operation move: Given two nodes $n_i, n_j$, and some scalar c, move alters the coordinate of $n_i$ bringing it either closer to or farther from $n_j$ by an amount determined by c. The coordinate xi is moved along the arc at unit distance from the origin $x_0$, and in the plane designated by the points $x_0, x_i, x_j$:

$$\text{move}(n_j, x_j, c) \rightarrow n_i'$$

This operation can be performed on any two nodes without regard to language. The maximum distance between any two nodes is 2. At their closest, two nodes can have a distance of zero, but in order to remain separate nodes they must either differ in their string a, or be associated with different languages.

MDT

A marked-lemma dependency tree (MDT), is defined as the tuple (N, E, T), where N is a set of nodes $n_i$, and where each node $n_i$, defined above as the tuple $(x_i, a)$, is, upon inclusion in the MDT, marked, augmenting it to be the tuple $(x_i, a, m_i)$, where $m_i$ comprises a set of information about the node comprising one or more of: part of speech, inflection, tense, theta role, person, mood, case, animacy, shape, case, and position within a MDT, and where E is a set of directed edges between coordinates $x_i \in S$ of nodes in N, and T is the "topic stack," a list of concepts sorted by salience or importance given some context. Multiple marks may be associated with each node. Inherent to the inclusion of N are: some language L, and a, a set of symbols.

Each MDT typically comprises nodes that are all associated with a single language. An exception would be when linguistic input in one language references a phrase or passage in some other language. An interlingua MDT is not associated with any human language. Its nodes are not required to be associated with any characters or symbols (i.e., a is null).

Training and Standard Function of the System

An MT system 700 generating MDTs and using them as interlingua may be (but not must be) trained from human-tagged data. It is believed that a multi-layered and multi-faceted set of methods can be developed along standard and cutting-edge practices known to the machine-learning community. These methods may include but are not limited to language models, PoS models, parse tree models, and tree transducers. In the preferred embodiment, one multilayered process (also referred to as a module or program) will take text or speech in some language A as input, and output language-A MDTs. Using this output, a second module or program will generate interlingua MDTs. A third module or program will use that output to generate MDTs in some language B. A fourth module or program will use this output to generate text or speech in language B.

Cross-Pollination Between Languages

When an embodiment of the disclosed invention is trained on the language pair (A,B), using parallel texts, and then on the language pair (B,C), the system receives some benefit with respect to the pair (AC), even without explicit training. After training on (A,B), there will exist some non-empty set of language-A nodes $N_{A1}$ that are close (in S) to their language-B counterparts $N_{B1}$. After training on (B,C) there will be analogous sets $N_{B2}$ and $N_{C2}$. Assuming some similarities in the subject matter of both sets of parallel texts, there will be a non-empty intersection between $N_{B1}$ and $N_{B2}$. Therefore, there will be a non-empty subset of $N_{A1}$ that are close to nodes in $N_{C2}$.

Referents

The stack of topics T, which is associated with each MDT, can be consulted to generate a list of potential referents whenever pronouns or anaphora are encountered in a phrase or sentence. The topic stack is generated before generating the rest of the MDT, but can be altered during and afterward as well. Candidates for entries in the topic stack are drawn from all nouns in the current phrase or sentence, nearby phrases and sentences, the current document, the current scope, and any other source the system deems relevant. In some embodiments other parts of speech will be included besides nouns.

There are many extant strategies in the machine learning literature to select for the most important words in a given sentence or document.

Top-Down Vs Bottom-Up

The bottom-up strategies that may be used by the invention are those which perform a function on a word or phrase based on information associated with only nearby words or phrases. Top-down strategies include the use of document-level and scope-level information. Both are used in conjunction in the invention, especially as they both relate to beam search and the pruning of possible tree parses and MDTs at each step of the MT process.

Graceful Failure

The disclosed invention may have the capacity to fail gracefully, i.e., there will be circumstances where the system does not have an output in language B for which it also has high-confidence. Typically this will occur because, during an internal step in the process, there were no close-proximity nodes in the semantic space. For example, this may occur when mapping from language A nodes to interingua nodes. If the system has no high-proximity nodes to choose from, it will search farther and farther until it finds at least one node. Since location in the semantic space is analogous to relatedness, the nearest node will represent a location in semantic space most closely associated with the original node in A. The final output will not be the optimal solution, but will be the next-best solution of which the system is capable.

Knowledge Representation

Each interlingua node represents a semantic element. Each interlingua MDT represents a precise combination of semantic elements. This system is a simple yet still sufficiently-expressive method of knowledge representation. It is simpler than other extant non-human-language interlinguas, yet more expressive than any human language, i.e. it can express more in a given number of bytes. Interlingua MDTs could be used, manipulated, and combined by external systems to achieve artificial intelligence (AI) goals. They represent a high-definition scaffolding upon which a host of AI applications could be built. It is contemplated that example systems based on the present invention will be further described hereafter.

Mapping to Perception

One such application could be the mapping of sets of MDTs to perception systems, e.g., visual convolutional NNs. For example, some systems may map almost any image of a cat to the word "cat." The disclosed invention can take that one step further, mapping such images to the English-language node representing the word "cat" having an associated definition. With a large number of such percept-node mappings in place, and MDTs learned from parallel texts, relationships between these nodes can be inferred. Real world knowledge can be flexibly obtained, represented, used, and inferred from such a system. In addition, using the systems and methods of the invention, the image can be associated with the word "cat" rendered in other human languages.

Games

Such a system could be easier to construct and operate within an online game. Consider a game with many online players and a visual system to present that world to each viewer. The people who play the game often interact with each other using language, either text or speech. It is assumed that they will often mention or discuss things and actions that exist or take place within the world of the game. An MDT-mapping-to-percept system like the one described above will be very powerful in such a situation because all objects in a simulated world are well-defined in a way that does not defy computer analysis. It is a relatively simple matter for a computer program to define, describe, combine, refer to, and manipulate objects in a simulated world.

One novel aspect of the invention is the generation and use of MDTs. They can be both learned from and used in translation between human languages. Human feedback can improve the system making it better at translation which can lead to more use, and therefore even faster improvement. The byproduct and perhaps even more important function of the system will be one of knowledge representation for AI. Constellations of nodes in semantic spaces and the MDT constructs therein will provide a platform for many technological advances in NLP and AI.

Another novel aspect of the invention its lack of a reliance on part of speech (PoS). Although PoS appears intuitively to be consistent with human language in most cases, there is no perfect definition for verb or noun, for example, which will fit 100% of cases in all languages. PoS is a prescriptive set of ideas imposed upon human language, not an immutable emergent truth. Although PoS can offer insight and is often a useful model, there are abstractions of language which will not reach their full potential while dependent on this prescriptive model. The enclosed invention is able to benefit from PoS, but the nodes in an MDT do not require PoS marking. In such case that non-PoS MDTs are used for MT, the system may still rely on the same parsers, but will ignore the PoS elements. It is by this ignorance that the MT system overall will not be biased against novel uses of well-known words, e.g. when "friend" was first used as a verb.

Another novel aspect of the inventions is the precise definition of a "semantic space." Most notions of semantic space include the idea of a high dimensional space in which each word is made unique by its associated coordinate. Most notions also include the concept where relative distance between these words mimics relatedness between these words. Let SSc refer to the type of semantic space commonly-practiced by experts (mostly based on instantiations of word2vec), and let SSi refer to the semantic space disclosed in this invention. The SSi is distinct from an SSc in the following ways: 1.Composition, 2.Construction, 3.Combination.

Composition of the Semantic Space

The semantic space used by the invention (SSi) is a conceptual space, not a word space. Any two distinct coordinates in a SSi refer to distinct meanings. They could both be represented by the same word (where each "word" is merely a lexical item, a sequence of letters in some given script). Additionally, two words could represent that same point in a SSi, e.g. "dog" and "canis lupus familiaris." In contrast, the typical SSc is populated with words. To handle polysemy, some SSc's may have multiple references of a word (e.g. "bank" as in financial institution and "bank" as in riverside), but lexical elements, as opposed to elements of meaning, are still the central organizing element upon which an SSc is constructed, a fact that inevitably shapes the SSc's that are used in practice, making them different from a SSi, which has pure concepts as its organizing elements. A difference like this may seem trivial at the micro scale, but will manifest as a non-trivially different semantic model when constructed from a large dataset.

Motivation and Construction of the Semantic Space

Some experts will claim that SSc's already exhibit a correlation between dimensions and concepts, and such is true, but the motivation and method behind the construction of a typical SSc is so different from the SSi that the resultant systems that use them will be categorically different. The motivation behind most SSc's is that a given word can be represented as a function of the context (other words) in which it is commonly found. The motivation behind the SSi is that given a space with N dimensions, and a language L with no more than N conceptual dimensions, there exists some configuration of points in that space such that mapping each sense of each word to one of said points will support the distinction between concepts and mimic the relative distances between them. The configuration constructed from this motivation will be likely very dissimilar from that of the SSc. This subtle difference in motivation will lead to a drastically different model as it scales up, even if the number of dimensions were the same, which they are typically not.

Combination of Semantic Spaces

In some embodiments of the invention there are multiple semantic spaces. Each space is stored as an object (in the broadest sense, not merely the object-oriented programming sense) in computer memory. Selection of the semantic space entails retrieving some pointer or pointer-equivalent to the object, thus enabling operations on the space and operations on the points in that space. Let this selection process be referred to as SELECT. SELECT occurs both during learning (when being trained by data and/or user input), and during usage (when translating). Spaces can be combined in "parallel", where SELECT uses some process to determine which space to select from a known set. For instance, each space could be associated with a field of learning (e.g. "Legal," "Medical," "Economics", "General"). SELECT could rely on an external process to determine first the category of the text, then SELECT retrieves the associated semantic space and then all subsequent processes proceed with the selected space. Alternatively, semantic spaces may be "nested," where a point or region in one semantic space may lead to another semantic space.

Further note than in some very simple cases one or more of these semantic spaces could be 1-dimensional, i.e. each element in the semantic space could be identified by a single number.

Definitions

Any reference in the claims to an electronic signal or an electromagnetic signal (or their equivalents) is to be understood that in a preferred embodiment the signal is a non-transitory electronic signal or a non-transitory electromagnetic signal. If the signal per se is not claimed, the reference may in some instances be to a description of a propagating or transitory electronic signal or electromagnetic signal.

Unless otherwise explicitly recited herein, any reference to "record" or "recording" is understood to refer to a non-volatile or non-transitory record or a non-volatile or non-transitory recording.

Recording the results from an operation or data acquisition, for example, recording results such as an electrical signal having a particular frequency or wavelength, or recording an image or a portion thereof, is understood to mean and is defined herein as writing output data in a non-volatile or non-transitory manner to a storage element, to a machine-readable storage medium, or to a storage device. Non-volatile or non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., re-writeable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer, in either one or a plurality of locations.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use, so that the result can be displayed, recorded to a non-volatile memory, or used in further data processing or analysis.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein, so long as at least some of the implementation is performed in hardware.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

The invention claimed is:

1. A system for translation from a first human language to a second language, comprising:
   one or more processors; and
   one or more non-transitory memory units coupled to said one or more processors storing computer readable program instructions, wherein the computer readable program instructions configure the one or more processors to perform the steps of:
   receive an input representation of information in the first language;
   convert the input representation of information in the first language to an interlingua;
   convert said interlingua to a representation of information in said second language; and
   output said representation of information in said second language, wherein the interlingua are represented using a mathematical structure and one or more marked-lemma dependency trees (MDTs).

2. The system of claim 1, wherein the first language includes a plurality of expressions in the first language and the second language includes a plurality of expressions in the second language.

3. The system of claim 1, wherein the first language is a first human language and is a subset of the expressions possible in the first human language, and the second language is a second human language and is a subset of expressions possible in the second human language.

* * * * *